(12) United States Patent
Pedrini

(10) Patent No.: US 7,108,163 B1
(45) Date of Patent: Sep. 19, 2006

(54) UNIVERSAL SYSTEM FOR SECURING AN EQUIPMENT CARRIER TO A VEHICLE-MOUNTED SUPPORT

(76) Inventor: Fabio Pedrini, Via Zamboni 1 Scala-A, Pino-1, Interno-3, Cap 40125 Bologna (IT)

( * ) Notice: Subject to any disclaimer, the term of this patent is extended or adjusted under 35 U.S.C. 154(b) by 398 days.

(21) Appl. No.: 10/156,777

(22) Filed: May 28, 2002

(51) Int. Cl.
*B60R 9/00* (2006.01)

(52) U.S. Cl. .................. 224/319; 224/323; 224/917.5; 224/572; 224/560; 224/331

(58) Field of Classification Search ................ 224/319, 224/523, 324, 325, 331, 917.5, 572, 560, 224/561, 555, 558, 538, 545, 548, 551, 309, 224/323; 24/278, 483, 485, 525, 569, 319
See application file for complete search history.

(56) References Cited

U.S. PATENT DOCUMENTS

| | | | | |
|---|---|---|---|---|
| 554,808 | A | * | 2/1896 | Weaver ........................ 24/278 |
| 1,412,189 | A | * | 4/1922 | Lopdell ........................ 24/278 |
| 2,772,824 | A | * | 12/1956 | Binding ........................ 224/319 |
| 3,104,042 | A | * | 9/1963 | Gaus ............................ 224/309 |
| 4,524,893 | A | * | 6/1985 | Cole ............................. 224/319 |
| 4,527,827 | A | * | 7/1985 | Maniscalco et al. ........ 224/405 |
| 4,629,104 | A | * | 12/1986 | Jacquet ........................ 224/324 |
| 4,867,362 | A | * | 9/1989 | Finnegan et al. ............ 244/319 |
| 5,067,644 | A | * | 11/1991 | Coleman ...................... 224/324 |
| 5,316,192 | A | * | 5/1994 | Ng ................................ 224/324 |
| 5,456,397 | A | * | 10/1995 | Pedrini ........................ 224/324 |
| 5,465,890 | A | * | 11/1995 | Allen ........................... 224/324 |
| 5,673,889 | A | * | 10/1997 | DeValcourt ............. 248/229.17 |
| D415,096 | S | | 10/1999 | Englander et al. |
| 6,079,601 | A | * | 6/2000 | Murray ........................ 224/319 |
| 6,164,507 | A | * | 12/2000 | Dean et al. ................... 224/324 |
| 6,257,261 | B1 | * | 7/2001 | Johnson ........................ 135/96 |
| 6,257,471 | B1 | | 7/2001 | Dixon et al. |
| 6,371,343 | B1 | * | 4/2002 | D'Souza ...................... 224/324 |
| 6,431,423 | B1 | * | 8/2002 | Allen et al. .................. 224/509 |
| 6,616,023 | B1 | * | 9/2003 | Dahl et al. ................... 224/537 |
| 6,681,971 | B1 | * | 1/2004 | Laverack et al. ............ 224/319 |

* cited by examiner

*Primary Examiner*—Tri M. Mai
(74) *Attorney, Agent, or Firm*—Boyle Fredrickson Newholm Stein & Gratz S.C.

(57) ABSTRACT

An equipment carrier adapted for mounting to a support member associated with a vehicle, includes a base engageable with the support member and a universal mounting arrangement for securing the base to the support member. The universal mounting arrangement includes a flexible retainer member, such as a retainer strap, that extends from and is engageable with a clamping member movably mounted to the base. The retainer strap defines a free end that extends from one side of the base, and which is adapted to be wrapped about the support member and engaged with a releasable engagement arrangement associated with the clamping member. The retainer strap and the releasable engagement arrangement define a variable effective length of the retainer strap when the retainer strap is initially wrapped about the support member. An actuator member, such as a rotatable threaded member, is engaged with the clamping member and with the base for moving the clamping member away from the base. Movement of the clamping member away from the base functions to introduce tension into the retainer strap, to force the base against the upper surface of the support member and to draw the retainer strap into engagement with the support member. In this manner, the base is securely clamped onto the support member, to mount the equipment carrier to the support member. The flexibility of the retainer strap and the variable effective length provided by engagement of the retainer strap with the clamping member enables the retainer strap to be wrapped about a support member having any shape and configuration, to allow the equipment carrier to be mounted to various types of original equipment or retrofit support members.

12 Claims, 5 Drawing Sheets

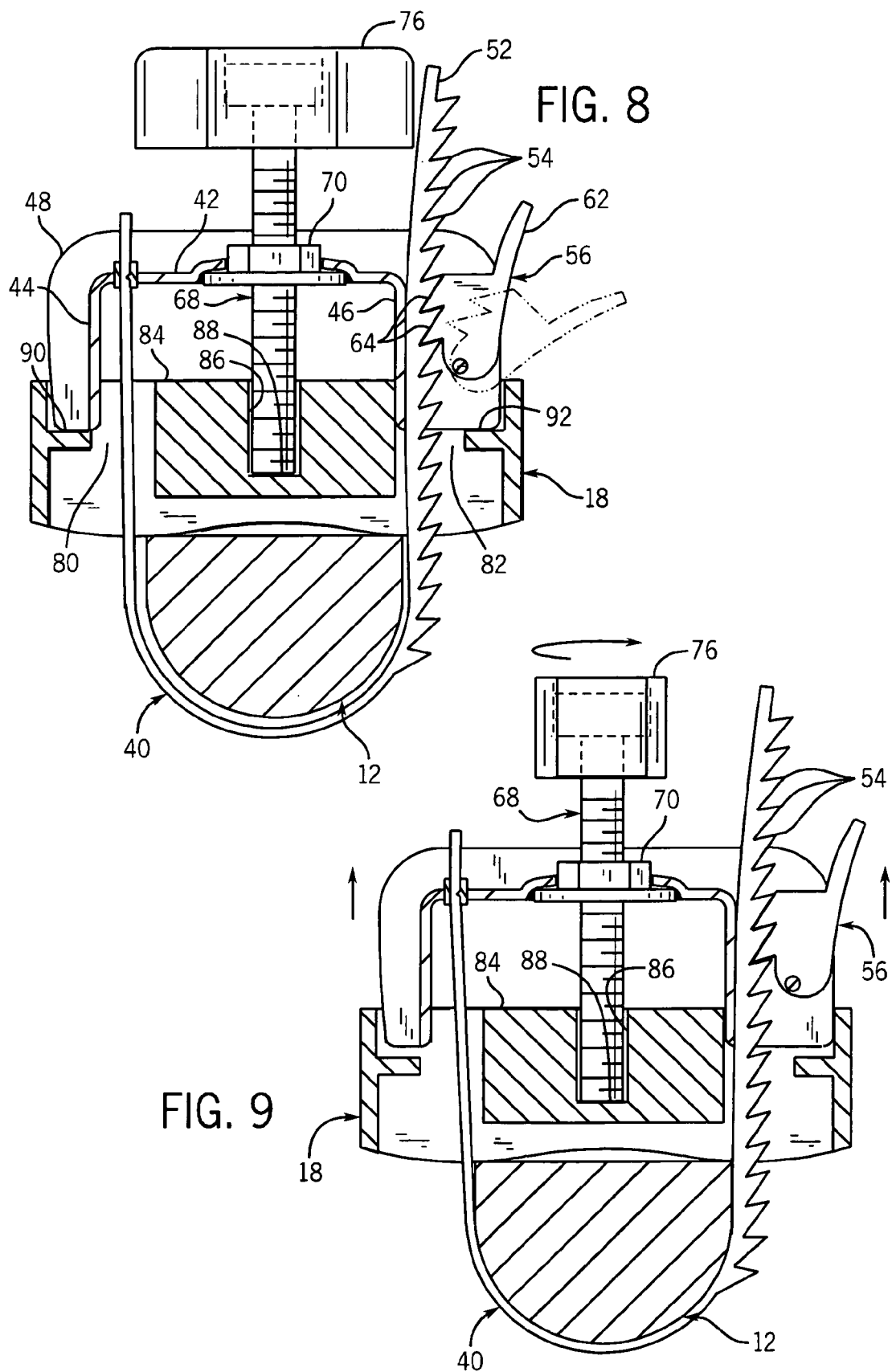

UNIVERSAL SYSTEM FOR SECURING AN EQUIPMENT CARRIER TO A VEHICLE-MOUNTED SUPPORT

BACKGROUND AND SUMMARY OF THE INVENTION

This invention relates to equipment carriers, and more particularly to an equipment carrier adapted for releasable mounting to a support member associated with a vehicle.

Various systems are known for mounting an equipment carrier, such as a bicycle rack or ski carrier, to a support member associated with a vehicle. A roof-mounted equipment carrier is typically interconnected with one or more support members, in the form of load bars or struts, that extend transversely between the sides of the vehicle roof. The support members have a wide variety of different configurations. Typically, the equipment carrier is mounted to the support member by means of a mounting arrangement that is designed for a specific type of support member. Normally, the mounting arrangement for securing an equipment carrier to one type of support member is not compatible with a differently configured support member, so that a different type of mounting arrangement must be employed in order to mount an equipment carrier to the differently configured support member. This results in an inconvenience to the user, in that the equipment carrier may only be usable in combination with one vehicle owned by the user, and it thus may be necessary to purchase a separate equipment carrier or different type of mounting arrangement if it is desired to use the equipment carrier with a different vehicle owned by the same user. In the event the user owns a single vehicle, the same problem can be presented when the user change from a vehicle having one type of support member to a vehicle having a different type of support member. Alternatively, if a mounting arrangement for one type of support member is used in connection with another type of support member, it is possible that the mounting arrangement may not provide a secure connection of the equipment carrier to the support member. This can result in a dangerous condition, since it is important to ensure that an equipment carrier is securely mounted to a vehicle during transport.

Further, a number of manufacturers offer support members, such as load bars or struts, that are adapted to be removably mounted to a vehicle for mounting various types of equipment carriers to the vehicle. Typically, each manufacturer of this type of support member provides a mounting arrangement for its own equipment carriers that is compatible with the specific configuration of its support members. This generally prevents a user from using equipment carriers available from one manufacturer with support members available from another.

It is an object of the present invention to provide a mounting arrangement for a vehicle-mounted equipment carrier, in which the mounting arrangement enables the equipment carrier to be secured to any type of vehicle-mounted support member, whether the support member is installed as original equipment on the vehicle or is a support member that is removably mounted to the vehicle. It is a further object of the invention to provide such a mounting system which can be utilized to secure an equipment carrier to a vehicle-mounted support member, regardless of the configuration of the support member and the manner in which an equipment carrier is intended to be mounted to the support member. It is a further object of the invention to provide such a mounting system which is capable of quickly and easily mounting an equipment carrier to a vehicle-mounted support member, and which enables the equipment carrier to be quickly and easily disengaged from the support member. Yet another object of the invention is to provide such a mounting system which is adaptable for use in connection with any type of equipment carrier so as to enable any type of equipment carrier to be mounted to any type of support member. A still further object of the invention is to provide such a mounting system which is relatively simple in its components and construction so as to allow ease of use and manufacture, yet which is operable to securely mount an equipment carrier to a vehicle-mounted support member.

In accordance the present invention, a mounting system for an equipment carrier includes a flexible retainer member that extends from the equipment carrier and is adapted to wrap about a support member interconnected with the vehicle. The equipment carrier includes a base which is adapted for placement on the support member, and the flexible retainer member extends from the base about the support member. The flexible retainer member defines a free end that is engageable with a releasable engagement arrangement, which is carried by a tensioner or clamping member that functions to tighten the flexible retainer member onto the support member so as to clamp the base member onto the support member. The clamping member is movably interconnected with the base member, so as to be movable away from the base member, and thereby the support member, to urge the base member toward the support member when the free end of the flexible retainer member is engaged with the clamping member via the releasable engagement arrangement.

In one embodiment, the flexible retainer member is in the form of a strap member having a fixed end secured to the clamping member and extending through the base member, with the free end of the strap member being engageable with the clamping member via the releasable engagement arrangement. The clamping member is movable away from the base member by means of a threaded member which is threadedly engaged with the clamping member and which defines an end in engagement with the base member. In this manner, rotation of the threaded member functions to move the clamping member away from the base member, to tighten the strap member and to thereby clamp the base member against the support member. The releasable engagement arrangement between the clamping member and the strap member may be in the form of a series of teeth formed on the strap member adjacent the free end of the strap member, and a movable locking member carried by the clamping member which is movable into and out of engagement with the strap member teeth. The locking member thus functions to releasably engage the free end of the strap member with the clamping member.

The invention also contemplates an improvement in an equipment carrier as well as a method of mounting an equipment carrier to a vehicle-mounted support member, substantially in accordance with the foregoing summary.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 8 is a view similar to FIG. 7, showing the mounting system of the present invention in an initial position in which the strap member is wrapped about the vehicle-mounted support member and is releasably engaged with the clamping member; and FIG. 9 is a view similar to FIG. 8, showing the clamping member moved away from the vehicle-mounted support member and the base member of the equipment carrier, so as to clamp the base member onto the vehicle-mounted support member.

DETAILED DESCRIPTION OF THE INVENTION

Figure 1:
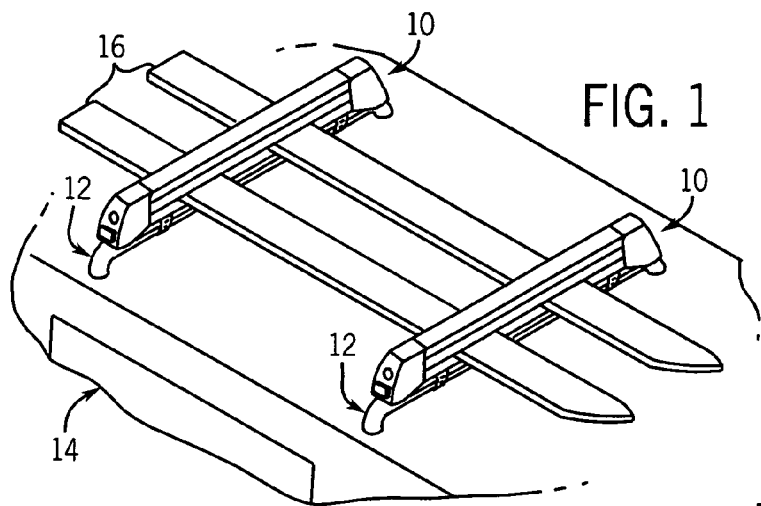
FIG. 1 is a partial isometric view illustrating one form of an equipment carrier adapted for mounting to support members associated with a vehicle, and incorporating the mounting system of the present invention.
Figure 2:
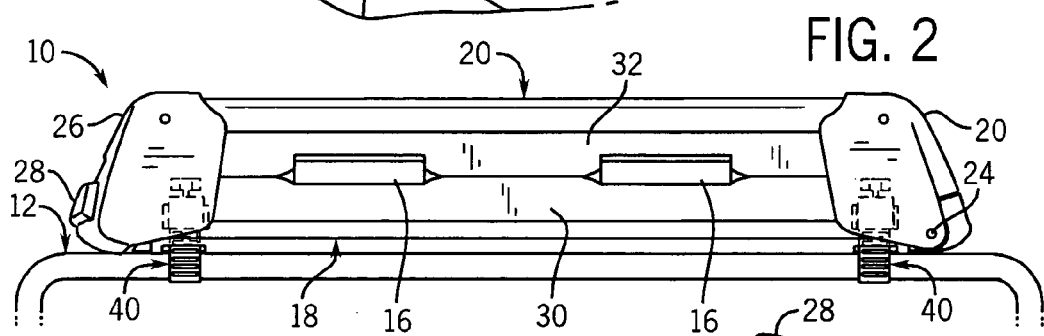
FIG. 2 is an elevation view illustrating an equipment carrier shown in FIG. 1 as engaged with one of the vehicle support members and showing the equipment carrier in a closed position.
Figure 3:
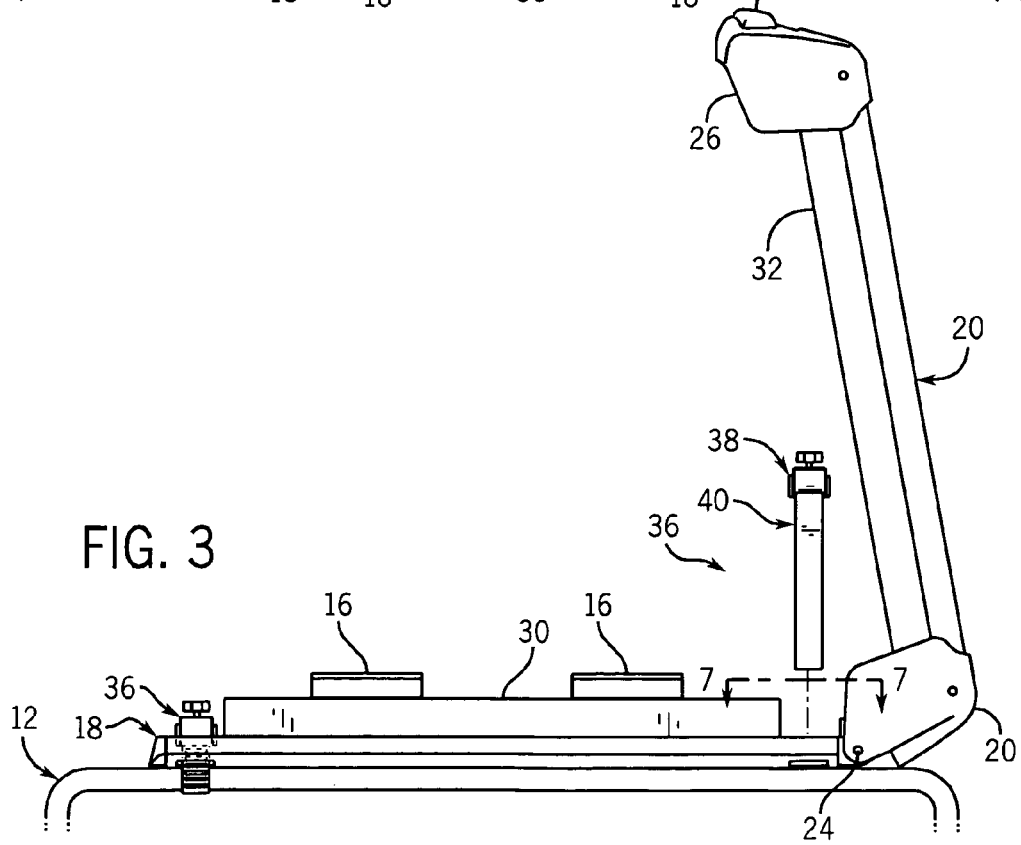
FIG. 3 is a view similar to FIG. 2, showing the equipment carrier in an open position.

Referring to FIG. 1, a pair of equipment carriers, in the form of ski carriers 10, are mounted to support members 12 which are secured to the roof of a vehicle 14, for use in transporting equipment, such as skis 16, on vehicle 12. As shown in FIGS. 2 and 3, the illustrated embodiment of each ski carrier 10 includes a base 18 and an arm 20 which is movably interconnected with base 18. At one end, arm 20 is connected to an end member 22, which is pivotably mounted to one end of base 18 via a pivot pin 24. At its opposite end, arm 20 is connected to an end member 26, which is selectively engageable with the opposite end of base 18 via a releasable latch arrangement of conventional construction, which includes a manually operable release button 28. A stationary resilient member 30 is secured to and extends upwardly from base 18. Likewise, a resilient member 32 is secured to the underside of arm 20. In a known manner, arm 20 is movable into engagement with base 18 to a closed position as shown in FIG. 2, to sandwich skis 16 between the facing surfaces of resilient members 30, 32. Also in a known manner, arm 20 is movable away from base 18 to an open position as shown in FIG. 3, which enables articles such as skis 16 to be placed on or removed from resilient member 30.

The components, construction and operation of ski carrier 10 described above are generally in accordance with the prior art, and form no part of the present invention.

Figure 4:
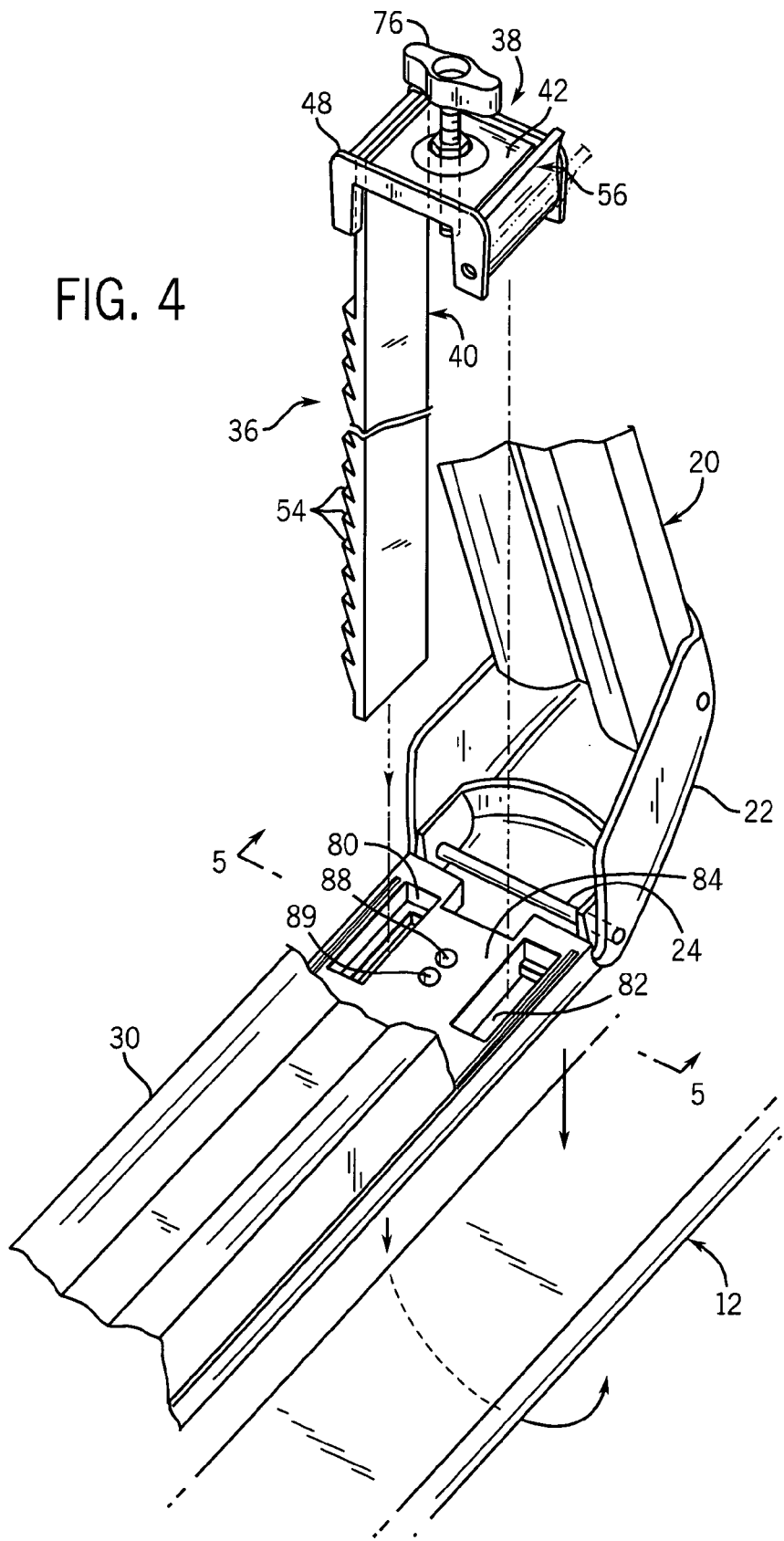
FIG. 4 is a partial isometric view of one end of the equipment carrier of FIG. 3, showing the mounting system in a disengaged position.
Figure 5:
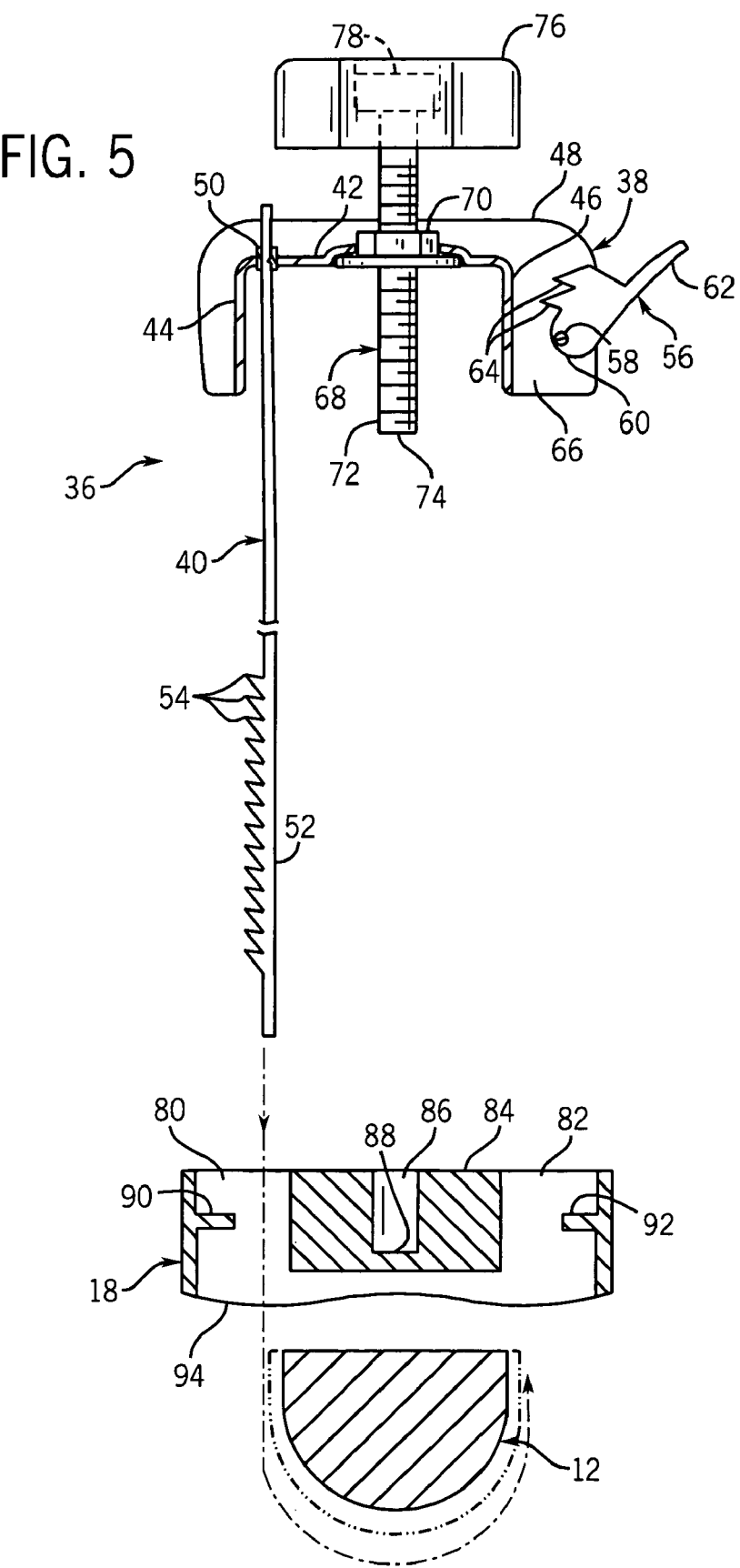
FIG. 5 is a section view taken along line 5—5 of FIG. 4.
Figure 6:
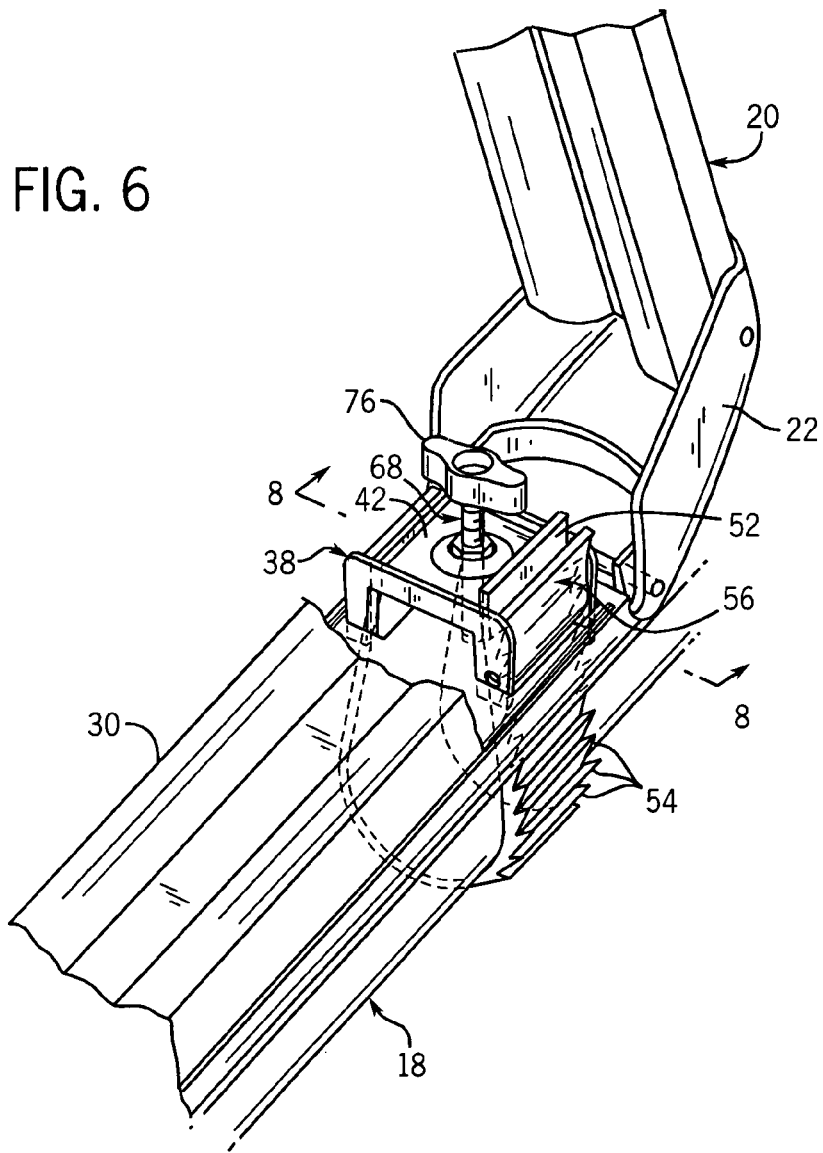
FIG. 6 is a partial isometric view similar to FIG. 4, showing the mounting system in an operative position so as to engage the equipment carrier with the vehicle-mounted support member.
Figure 7:
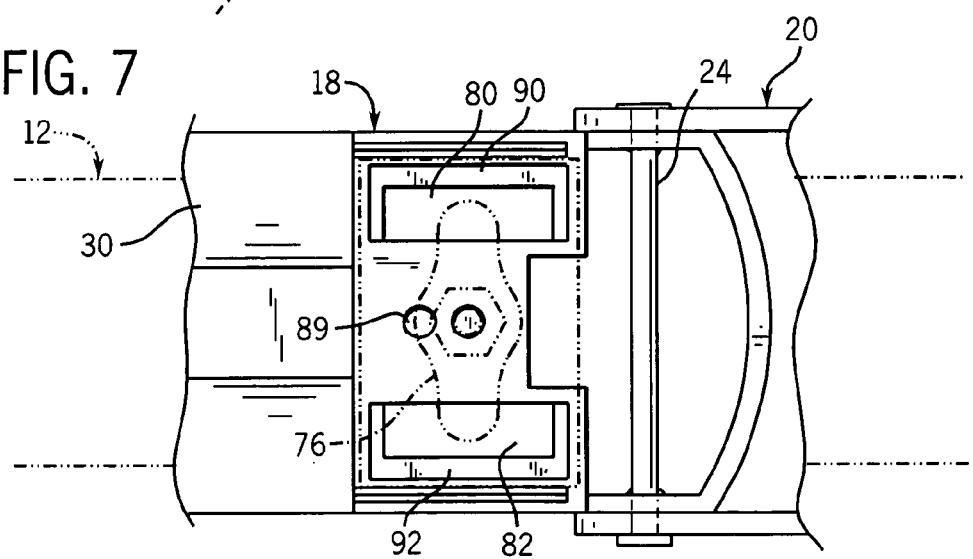
FIG. 7 is a partial section view taken along line 7—7 of FIG. 3.

In accordance with the invention, each ski carrier 10 is mounted to one of support members 12 via a universal mounting arrangement, shown generally at 36. As shown in FIGS. 3–5, each universal mounting arrangement 36 includes a tensioner or clamping member 38 and a flexible retainer member, in the form of a retainer strap 40, which extends from clamping member 38. In a manner to be explained, clamping member 38 and retainer strap 40 cooperate with base 18 so as to mount ski carrier 10 to support member 12. A mounting arrangement 36 is located at each end of base 18 for securing base 18 to support member 12 at spaced apart locations. The following description pertains to engagement of one of universal mounting arrangements 36 with one end of base 18, and is equally applicable to the mounting arrangement 36 at the opposite end of base 18.

Clamping member 38 is generally in the form of an inverted U-shaped bracket member, having a top wall 42 and a pair of depending side walls 44, 46. Walls 42–46 are located between a pair of inverted U-shaped flanges 48, which impart structural stiffness and rigidity to clamping member 38.

At one end, retainer strap 40 is fixed to clamping member top wall 42. Representatively, the fixed end of retainer strap 40 may be secured to a grommet 50, which in turn is mounted within a complementary slot formed in clamping member top wall 42 so as to fix the end of retainer strap 40 to clamping member 38. Retainer strap 40 defines a free end, shown at 52 opposite its end that is fixed to clamping member 38. Adjacent to and inwardly of its free end 52, retainer strap 40 defines a series of transverse axially spaced teeth 54.

Clamping member 38 further includes a locking member 56 located outwardly of the opposite end of top wall 52. Locking member 56 is pivotably mounted between end areas of flanges 48 by means of a pivot shaft 58 that extends between and is mounted at its ends to the end portions of flanges 48. As shown in FIG. 5, locking member 56 includes a main body section 60 which defines a passage within which pivot shaft 58 is received, as well as a lever section 62 extending upwardly from main body section 62 and a pair of engagement teeth 64 that extend inwardly from main body section 60 toward side wall 46. A space 66 is defined between the inner ends of teeth 64 and the outwardly facing surface of side wall 46. Locking member 56 is interconnected with a biasing member, such as a torsion spring (not shown) which is operable to urge counterclockwise rotation of locking member 56. FIG. 5 illustrates locking member 56 in a release position against the force of the biasing member, wherein teeth 64 are moved away from side wall 46. Normally, locking member 56 is biased to urge teeth 64 into engagement with side wall 46.

Clamping member 38 further includes a tensioning or operating arrangement, in the form of a rotatable threaded actuator member 68 engaged with a threaded nut 70. Threaded nut 70 is mounted within a complementary opening formed in top wall 42 of clamping member 38, such that nut 70 is nonrotatable relative to clamping member top wall 42. Actuator member 68 includes a threaded shank 72 having threads that mate with the threads of nut 70, and which defines an inner end 74. At its outer end, actuator member 68 includes a wing-type handle 76 which includes an opening complementary to the shape of a non-circular head 78 located at the outer end of shank 72. Actuator member 68 is rotatable by manual engagement with handle 74, which enables a use to rotate actuator member 68 relative to nut 70 and clamping member top wall 42.

As shown in FIGS. 4 and 5, base 18 of ski carrier 10 includes a pair of spaced apart passages 80 and 82 located on opposite sides of a bearing area 84. An upwardly facing passage 86 is formed in bearing area 84, and terminates in an inner end surface 88. A passage 89 is located adjacent passage 88, and extends completely through the material of base 18 so as to open both downwardly and upwardly.

A ledge 90 extends into passage 80, and extends throughout a portion of the perimeter of passage 80 including a pair of end sections and a side section, so as to define a narrowed area of passage 80 adjacent the facing side surface of base 18 that defines bearing area 84. Base 18 defines a similar ledge 92 that extends into passage 82 throughout a portion of the periphery of passage 82, including a pair of end sections and a side section which cooperate to define a narrowed area of passage 82 adjacent the facing side surface of base member 18 that defines bearing area 84.

In operation, ski carrier 10 is mounted to vehicle support member 12 as follows. Initially, ski carrier base 18 is placed on support member 12 such that the underside of base 18, shown at 94, rests on the upwardly facing surface of support member 12. Each universal mounting arrangement 36 is then utilized to secure one of the ends of base 18 to support 12. Initially, clamping member 38 of universal mounting arrangement 36 is engaged with base 18 by threading free end 52 of retainer strap 40 through passage 80 in base 18. Clamping member 38 is then moved into the upper areas of passages 80, 82 to an initial engagement position as shown in FIG. 8. In this position, the lower ends of flanges 48 rest on ledges 90, 92 of passages 80, 82, respectively, and the lower end of actuator member shank 72 is received within passage 86 in bearing area 84 of base 18. Retainer strap 40 is then looped or wrapped about support member 12. The user moves locking member 56 to its open or release position of FIG. 5, and then inserts free end 52 of retainer strap 40 through space 66 defined between the inner ends of teeth 64 and the outwardly facing surface of clamping member side wall 46. The user manually engages lever section 62 of locking member 56 to move locking member 56 to its open or release position, as shown in phantom in FIG. 8, to enable retainer strap free end 52 to be moved upwardly within and through space 66. The user pulls retainer strap free end 52 upwardly until retainer strap 40 engages the underside of support member 12, and releases engagement of locking member lever section 62. The biasing member interconnected with locking member 56, e.g. a torsion spring, which is operable to bias locking member 56 toward its engaged position, such that locking member 56 returns to its engaged position when the user releases manual engagement of locking member 56. In this manner, locking member 56 is moved to its engaged position, as shown in solid lines in FIG. 8. In its engaged position, locking member 56 is positioned such that its teeth 64 are moved into engagement with retainer strap teeth 54, to provide a fixed effective length of retainer strap 40. The user then manually operates handle 76 to turn actuator member 68 in a direction that functions to move clamping member 38 away from base 18 and support member 12, as shown in FIG. 9. Such rotation of actuator member 68 moves end 74 of actuator member shank 72 into engagement with inner end surface 88 of bearing area passage 86, to draw clamping member 38 upwardly upon rotation of actuator member 68 in this manner. Locking member teeth 64 remain in engagement with retainer strap teeth 54, such that retainer strap 40 is brought into engagement with the side surfaces and the underside of vehicle support member 12 while ski carrier base 18 is urged downwardly against the upper surface of support member 12. This functions to tension retainer strap 40 and to clamp ski carrier base 18 onto support member 12. Operation of each universal mounting arrangement 36 in this manner functions to fix the ends of ski carrier base 18 to support member 12, to securely mount ski carrier 10 to support member 12 of vehicle 14.

To remove ski carrier 10, the user initially rotates actuator member 68 in the opposite direction so as to relieve the tension on retainer strap 40, and then moves locking member 56 to its open or release position by manual engagement with lever section 62, to enable retainer strap 40 to be withdrawn from space 66 between locking member teeth 64 and clamping member side wall 46. The free end 52 of retainer strap 40 can then be moved out of engagement with support member 12, to disengage ski carrier base 18 from support member 12 and to enable removal of ski carrier 10.

As can be appreciated, the flexible nature of retainer strap 40 and the variable effective length provided by engagement of locking member 56 with retainer strap teeth 54, provides the ability for ski carrier 10 to be mounted to a support member having virtually any configuration or cross section. In this manner, ski carrier 10 can be mounted to virtually all types of original equipment support members, as well as to any type of support member that is adapted to be removably mounted to a vehicle, such as are available from a number of different manufacturers.

In addition, ski carrier 10 can also be mounted to a vehicle-mounted support member 12 without the use of universal mounting arrangement 36 by means of a mounting arrangement specifically designed for use with a certain type of support member. For example, support member 12 may have an inverted T-shaped slot intended for use in mounting equipment carrier components to a vehicle, such as is employed in a support member available from the Saris division of Graber Products, Inc. of Madison, Wis. under its designation TALON. An inverted T-shaped connector may be installed in passage 89, having a head that depends from the underside of base 18 and adapted to be received within the support member slot. The upper end of the connector is threadedly engaged with a wing nut or fingerwheel that bears against the upper surface of bearing are 84, and which is operable to clamp the underside of base 18 against the upper surface of the support member. In an application such as this, the components of universal mounting arrangement 36 are not employed and are removed from engagement with base 18. It is understood that the type of specific type of mounting arrangement described is but one example of numerous types of mounting arrangements having a specific configuration adapted for use with a support member having a complementary or mating configuration, and that numerous other mounting arrangements my be employed. It is also understood that base 18 may be provided with any other structure capable of being used to mount a specific type of mounting arrangement to base 18, in place of passage 89.

While the invention has been shown and described with respect to a particular embodiment, it is understood that various alternatives and modifications are contemplated as being within the scope of the present invention and covered by the appended claims. Such alternatives and modifications include, but are not limited to, the following. While universal mounting arrangement 36 is illustrated as being used in combination with a ski carrier adapted for mounting to the roof of a vehicle, universal mounting arrangement 36 may be employed to mount any type of equipment carrier or component to a support member connected with any part of a vehicle. Other types of equipment carriers include upright or fork-mounted bicycle carriers, snowboard carriers, canoe or kayak carriers, tool carriers, etc. The vehicle-mounted support members may be original equipment or removably mounted support members, or support members associated with carriers adapted to be mounted to the trunk area or hitch receiver of a vehicle. Further, while clamping member 38 has been illustrated and described as a member that is separate from base 18, it is also contemplated that the clamping member may be movably retained in engagement with base 18, such as via a hinge-type or slide-type arrangement that is operable to introduce tension into retainer strap 40 when the clamping member is moved away from base 18. While actuator member 68 is shown and described as having a threaded engagement with clamping member 58 to move clamping member 38 toward and away from base 18, it is also understood that any other type of actuator arrangement may be employed, e.g. a ratchet-type arrangement. Further, other types of adjustable length engagement arrangements may be interposed between the free end of retainer strap 40 and clamping member 38 in place of retainer strap teeth 54 and locking member engagement surface 64, as long as any such arrangement is operable to provide a releasable and adjustable fixed length engagement of the retainer strap with the clamping member. While the fixed end of retainer strap 40 has been illustrated as being secured to clamping member 38, it is also understood that the fixed end of retainer strap 40 may instead be fixed to base 18.

Various alternatives and embodiments are contemplated as being within the scope of the following claims particularly pointing out and distinctly claiming the subject matter regarded as the invention.

What is claimed is:

1. An equipment carrier for mounting to a support member associated with a vehicle, comprising:
    an equipment carrying member including a base member adapted for engagement with the support member; and
    a mounting arrangement associated with the equipment carrying member, wherein the mounting arrangement includes a flexible strap member and a tensioning arrangement, wherein the strap member defines a first end fixed to the tensioning arrangement and a free end spaced from the first end, wherein the free end of the strap member is adapted to be wrapped about the support member, and wherein the tensioning arrangement further includes a releasable retainer that engages the strap member toward the free end of the strap member, and a threaded tensioning member that engages the base member and is configured to apply tension to the strap member to draw the base member toward the support member.

2. The equipment carrier of claim 1, wherein the equipment carrier comprises a carrier for elongated articles that includes a clamping arm movably mounted to the base member, wherein the clamping arm is movable from an open position so as to receive one or more elongated articles between the base member and the clamping arm, to a closed position for securing the one or more elongated articles between the base member and the clamping arm.

3. The equipment carrier of claim 1, wherein the releasable retainer comprises a series of teeth on the strap member, and a movable locking member carried by the tensioning arrangement and selectively engageable with the series of teeth.

4. The equipment carrier of claim 3, wherein the threaded tensioning member is operable to tighten the strap member about the support member when the movable locking member is engaged with at least one of the teeth.

5. The equipment carrier of claim 1, wherein the tensioning arrangement includes a movable clamping member that is movable relative to the base member by operation of the threaded tensioning member in a direction away from the support member when the base member is placed on the support member to apply tension to the strap member.

6. The equipment carrier of claim 5, wherein the strap member extends through the base member for engagement about the support member, wherein movement of the clamping member away from the base member is operable to tension the strap member and force the base member toward the support member when the free end of the strap member is releasably secured to the clamping member.

7. The equipment carrier of claim 5, wherein the threaded tensioning member is threadedly engaged with the clamping member and defines an end in engagement with the base member, wherein rotation of the threaded tensioning member is operable to move the clamping member away from the base member.

8. In an equipment carrier for use in combination with a support member associated with a vehicle, the improvement comprising a base member adapted for engagement with the support member, a flexible strap member adapted for placement about the support member, and a releasable tensioning arrangement that cooperates with the flexible strap member to releasably tension the flexible strap member about the support member, wherein the flexible strap member defines a first end fixed to the tensioning arrangement and a free end spaced from the first end, wherein the free end of the flexible strap member is adapted to be wrapped about the support member, and wherein the tensioning arrangement further includes a releasable retainer that engages the strap member toward the free end of the strap member, and a threaded tensioning member that engages the base member and is configured to apply tension to the strap member to draw the base member toward the support member.

9. The improvement of claim 8, wherein the releasable tensioning arrangement comprises a clamping member that is movable away from the support member when the base member is engaged with the support member.

10. The improvement of claim 9, wherein the releasable retainer comprises a series of teeth associated with the strap member adjacent the free end of the strap member, and a movable locking member that is movably mounted to the clamping member for selective engagement with at least one of the teeth associated with the clamping member.

11. The improvement of claim 8, wherein the strap member extends through the base member for placement about the support member and through the base member for engagement with the releasable retainer.

12. In an equipment carrier for use in combination with a support member associated with a vehicle, the improvement comprising a base member adapted for placement on the support member; a flexible strap member carried by a clamping member, wherein the strap member defines a fixed end connected to the clamping member and a free end so as to enable the strap member to be placed about the support member; and a releasable engagement arrangement carried by the clamping member that engages the free end of the strap member to releasably engage the strap member about the support member, wherein the strap member extends through the base member for placement about the support member and through the base member for engagement with the releasable engagement arrangement, wherein the clamping member is movable away from the support member via a rotatable threaded member that is threadedly engaged with the clamping member and which defines an end in engagement with the base member, wherein rotation of the threaded member is operable to move the clamping member away from the base member via the threaded engagement between the clamping member and the threaded member, to draw the base member toward the support member.

* * * * *

UNITED STATES PATENT AND TRADEMARK OFFICE
CERTIFICATE OF CORRECTION

PATENT NO. : 7,108,163 B1  Page 1 of 1
APPLICATION NO. : 10/156777
DATED : September 19, 2006
INVENTOR(S) : Fabio Pedrini It is certified that error appears in the above-identified patent and that said Letters Patent is hereby corrected as shown below:

ON THE FACE PAGE, ITEM (56)

(56) References Cited:   Please insert the following references.

| | | |
|---|---|---|
| -- 3,848,785 | 11/1974 | Bott |
| 4,487,349 | 12/1984 | Kudo |
| 4,817,838 | 4/1989 | Kamaya |
| 4,930,671 | 6/1990 | Tittel |
| 4,940,175 | 7/1990 | Tittel |
| 5,054,673 | 10/1991 | Dixon |
| 5,390,840 | 2/1995 | Arndsson |
| 5,490,621 | 2/1996 | Dixon et al |
| 5,573,160 | 11/1996 | Dixon et al |
| 5,584,521 | 12/1996 | Hathaway et al |
| 5,657,913 | 8/1997 | Cucheran et al |
| 5,769,292 | 6/1998 | Cucheran et al |
| 5,938,090 | 8/1999 | Dixon et al -- |

Signed and Sealed this

Sixteenth Day of September, 2008

JON W. DUDAS
*Director of the United States Patent and Trademark Office*